UNITED STATES PATENT OFFICE.

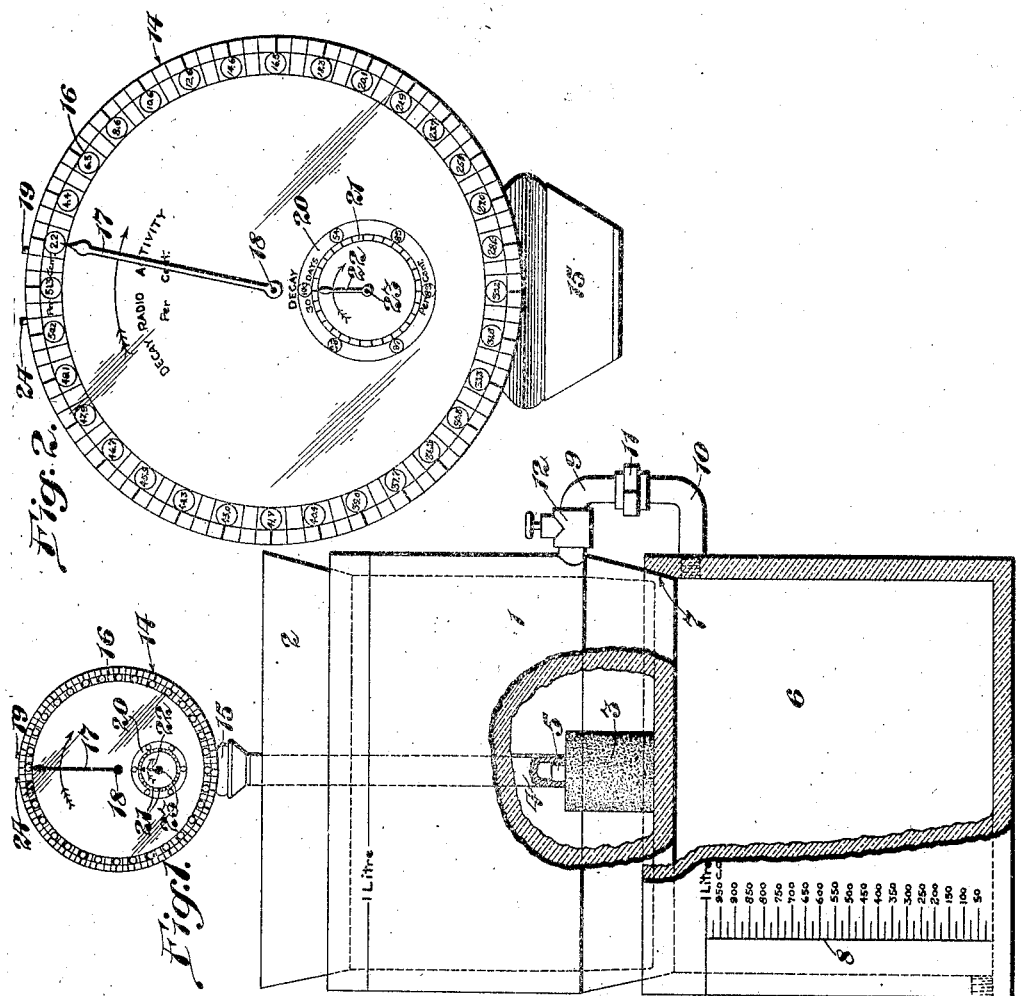

GEORGE KUNKLE, OF GRAND JUNCTION, COLORADO.

RADIUM HYDRO-EMANOMETER.

1,395,120.  Specification of Letters Patent.  Patented Oct. 25, 1921.

Application filed March 12, 1917. Serial No. 154,355.

*To all whom it may concern:*

Be it known that I, GEORGE KUNKLE, a citizen of the United States, residing at Grand Junction, Mesa county, and State of Colorado, have invented a new and useful Radium Hydro-Emanometer, of which the following is a specification.

This invention relates to the use of various radio-active salts for rendering water radio-active, and specifically to radium hydro-emanometers.

The therapeutical use of water containing radium or emanation of radium in solution has become one of the most universally recognized and approved methods of radium therapy.

The instruments heretofore devised and used for the saturation of water with emanations of radium possessed no method whereby the operator or user could determine at any moment or instantly the volumetric strength or degree of saturation of the water.

The instruments now in use, such as the fontactoscope, the electroscope and the electrometer, are capable of use only for sampling and testing the radio-active waters, and they are neither based upon, nor operate upon, any time factor for indicating constantly the radio-active changes. Furthermore such instruments are highly sensitive and lose their usefulness by becoming contaminated if kept exposed in the same building to radio-active substances.

Moreover, the pains-taking labor and care involved in making the tests by such instruments is enormous, and where accuracy and reliability is required, as is the case in radium therapy, old "standards" cannot be depended upon, and a new one must be made for every test. Obviously, therefore such methods of calculating the saturations from the radium content with a constantly varying volume and definitely ascertainable time factor, are highly objectionable and subject to many other disadvantages which it is unnecessary to mention.

As a result of these objections and disadvantages there is an existing necessity for a simple and reliable instrument for the therapeutical dispensation of radio-active waters of known definite strength per volume.

Since the time of radio-active change is an invariable physical attribute of the phenomenon of radio-activity, an instrument based upon the time factor and operating in conformity with the known changes of radio-activity overcomes the objections and disadvantages suggested, and fills the necessity for a reliable instrument for indicating at any time the condition of radio-activity of the water.

The object of the present invention is to provide a simple and reliable instrument actuated by clock work and so calibrated that it indicates constantly the decay and recovery of radio-activity in predetermined periods to equilibrium, which is thirty days.

In the accompanying drawing, in which I have illustrated one form of instrument arranged in conformity with my present invention, Figure 1 is an elevation of the instrument partly in section.

Fig. 2 is a view of one side of the indicator.

The instrument illustrated includes a generation chamber or reservoir 1 which is adapted to contain the water to be saturated or impregnated with radium emanation, so as to be given the quality of radio-activity. While this reservoir may be of any appropriate material it is preferably glass, and is provided with a ground glass cover 2 which fits into the upper portion of the reservoir and constitutes a hermetic closure. Within the reservoir 1 is placed a porous cell 3 made of alundum clay, or other material appropriate for the same purposes, for containing insoluble radium salts. A pipe 4 extends through the cover 2 and is connected to the cell 3 by a flange or ring 5 on the cell which is encircled by the pipe. The cell is thereby held stationary, and the instrument may be moved from place to place without displacing the cell.

After the water in the generation reservoir 1 has been rendered radio-active it may be transferred into a storage reservoir 6 upon which the generation reservoir is supported. As shown the generation reservoir and the storage reservoir are fitted together by an air-tight ground glass joint 7, the lower end of the generation reservoir being tapered to fit against a matching surface within the upper end of the storage reservoir to form the air-tight joint desired. The storage reservoir is formed with a scale 8 graduated to one liter in cubic centimeters for visually indicating the quantity of water withdrawn from the storage reservoir.

The means for transferring the radioactive water from the generator reservoir to the storage reservoir comprises a section of pipe 9 in connection with the generation reservoir; and a section of pipe 10 in connection with the storage reservoir releasably united to the pipe 9 by a union 11. The union 11 is made releasable in order to permit the separation of the two reservoirs for cleaning, or to be packed for shipping or other desirable purposes. One of the sections of pipe, preferably the section 9, is equipped with a valve 12 of usual construction and operation which is manipulative for the purpose of opening and closing the pipe.

The storage reservoir is provided with a valve controlled faucet 13 by which the radio-active water may be withdrawn in any desired quantity, proper observation being made of the scale 8 as the water is withdrawn so that the water may be withdrawn in accurately measured quantities.

As heretofore mentioned the time of radio-active change is an invariable physical attribute of the phenomenon of radio-activity. Therefore, since the time factor is known, it is possible to indicate the changes of radio-activity in conformity with the time factor. For this purpose I have provided a registering mechanism in connection with the instrument for indicating the changes in radio-activity continuously in three hour periods to a condition of restored equilibrium, which is known to be thirty days.

The actuating device of the registering mechanism is contained within a case 14 having a pedestal 15 seating within and closing the upper end of the pipe 4. The case has on one side a dial 16 in connection with which a pointer or indicator 17 operates to indicate the percentage of decay of radio-activity of the water in the storage reservoir 6 over three hour periods to four days, or ninety six hours. Thus, it may be said that the dial 16 and indicator or pointer 17 constitute clock mechanism for indicating the percentage of decay of radio-activity of the contents of the storage reservoir 6 for any period of time that the water has been within the storage reservoir 6, up to four days. The indicator or pointer 17 is on a spindle 18 and is actuated in a clockwise direction by ordinary clock work mechanism within the case 14. The clock work mechanism is of the usual well known stop watch type which may be started by operation of the usual controller 19. Since this clock mechanism is well known and the specific construction thereof is no part of my present invention, it is deemed unnecessary to illustrate it in detail.

In connection with the three hour dial and percentage indicator, I also provide an indicating device for indicating the percentage of decay of radio-activity in the storage reservoir in five day periods to complete decay, which is thirty days. This indicator includes a percentage dial 20 adjacent to a thirty day period dial 21, upon which operates an indicator 22 actuated by a spindle 23. The spindle 23 is also actuated by the clock mechanism and requires thirty days to make a complete revolution in a clockwise direction. The indicators may be stopped at any time by operating the usual stopping device 24.

The interior mechanism for controlling the indicators is simply clockwork of well known construction and operation, of the type employed in the usual stop watches. The clock work, however, is essentially regulated, timed and coördinated to operate in accordance with the time factor of change of radio-activity. The indicators are returned to their starting points in a well known manner by pressure applied to the stop watch devices 24.

I claim:

1. A device of the character described, comprising a generation reservoir, a porous cell composed of alundum clay adapted to contain radium salts seated on the bottom of the reservoir, a removable cover for the reservoir, and a device supported by the cover and detachably engaging the cell preventing lateral movement of the cell in the reservoir.

2. An instrument of the character described, comprising a generation reservoir, an alundum clay cell seated on the bottom of the reservoir adapted to contain radium salts, a cover for the reservoir, a pipe supported by the cover and removably engaging said cell to prevent movement of the cell relative to the reservoir, and an indicating instrument supported by said pipe for indicating the decay of radium activity.

3. An instrument of the character described, comprising a generation reservoir arranged to contain water to be rendered radio-active, a cell seated on the bottom of the reservoir arranged to contain radium salts, a device for holding the cell from movement relative to the reservoir, an instrument for indicating the decay of radio-activity, a storage reservoir arranged to receive the radio-active water from the generation reservoir, a passage for withdrawing the radio-active water from the storage reservoir, and a device for indicating visually the quantity of water withdrawn from the storage reservoir.

In witness whereof, I have signed this specification.

GEORGE KUNKLE